United States Patent [19]

Ishigami

[11] Patent Number: 5,116,129
[45] Date of Patent: May 26, 1992

[54] DIGITAL PHASE RAMP TYPE FIBER OPTIC GYRO

[75] Inventor: Motohiro Ishigami, Tokyo, Japan

[73] Assignee: Japan Aviation Electronics Industry Limited, Tokyo, Japan

[21] Appl. No.: 618,903

[22] Filed: Nov. 28, 1990

[30] Foreign Application Priority Data

Nov. 30, 1989 [JP] Japan .................................. 1-311649

[51] Int. Cl.$^5$ ............................................ G01C 19/72
[52] U.S. Cl. .................................................... 356/350
[58] Field of Search ......................................... 356/350

[56] References Cited

U.S. PATENT DOCUMENTS 4,705,399 11/1987 Graindorge et al. ................ 356/350
5,018,859 5/1991 Chang et al. ......................... 356/350

FOREIGN PATENT DOCUMENTS 2152207 7/1985 United Kingdom .

OTHER PUBLICATIONS

"Principle of the Digital Phase Ramp", Lefevre et al., 1986, pp. all.

*Primary Examiner*—Samuel A. Turner
*Attorney, Agent, or Firm*—Pollock, Vande Sande and Priddy

[57] ABSTRACT

In a digital phase ramp type fiber optic gyro, a first error signal is detected from the output of an opto-electric converter, and a step value is determined based on the first error signal. An accumulator accumulates the step values to produce an accumulated output as a digital ramp signal, and when the accumulated output exceeds a specified value, causes an overflow. The digital ramp signal is converted by a D/A converter to an analog signal, which is provided to an optical phase modulator. A second error signal detector detects the difference between the outputs of the opto-electric converter at an operating point when the overflow occurs and at the immediately preceding operating point. Based on the sign of the overflow and the sign of a biasing signal at the time of occurrence of the overflow, a negative feedback control circuit determines which of four values the operating point corresponds to, and creates a negative feedback error signal which controls the conversion gain of the D/A converter.

5 Claims, 8 Drawing Sheets

| OVF | OVF IN PREVIOUS $\tau$ | BIASING SIG | S/H CKT |
|---|---|---|---|
| NO | NO | $-\frac{\pi}{4}$ | I ($-\frac{\pi}{2}$) |
| | | $+\frac{\pi}{4}$ | II ($+\frac{\pi}{2}$) |
| | YES | $-\frac{\pi}{4}$ | III ($+\frac{3}{2}\pi$) |
| | | $+\frac{\pi}{4}$ | IV ($-\frac{3}{2}\pi$) |
| YES | ✕ | $-\frac{\pi}{4}$ | III ($+\frac{3}{2}\pi$) |
| | | $+\frac{\pi}{4}$ | IV ($-\frac{3}{2}\pi$) |

| OVF | SIGN OF OVF | BIASING SIG | S/H CKT |
|---|---|---|---|
| NO | | $-\frac{\pi}{2}$ | I $(-\frac{\pi}{2})$ |
| | | $+\frac{\pi}{2}$ | II $(+\frac{\pi}{2})$ |
| YES | − | $-\frac{\pi}{2}$ | III $(+\frac{3}{2}\pi)$ |
| | + | $+\frac{\pi}{2}$ | IV $(-\frac{3}{2}\pi)$ |
| | + | $-\frac{\pi}{2}$ | V $(-\frac{5}{2}\pi)$ |
| | − | $+\frac{\pi}{2}$ | VI $(+\frac{5}{2}\pi)$ |

DIGITAL PHASE RAMP TYPE FIBER OPTIC GYRO

BACKGROUND OF THE INVENTION

The present invention relates to a digital phase ramp type fiber optic gyro in which right-handed light and left-handed light are propagated through a looped optical transmission line, a ramp signal which provides a ramp phase of a step size cancelling a phase difference between the right-handed and the left-handed light which is induced in accordance with an angular rate applied to the optical transmission line and a biasing signal which provides phase differences of $+\pi/2$ rad. alternately between the right-handed and the left-handed light are created by digital processing, and the input angular rate is obtained from the step size or frequency of the ramp signal.

FIG. 1 schematically shows a conventional zero-method fiber optic gyro. Light from a laser or similar light source 11 is split by a beam splitter 12 into two beams which are applied, as a right-handed beam 14 and a left-handed beam 15, to a looped optical transmission line 13 through its both ends 13a and 13b, respectively. The optical transmission line 13 is formed by a single-mode optical fiber, for instance. The two beams propagate through the optical transmission line 13 in opposite directions and are emitted therefrom, and they are recombined by the beam splitter 12 into interference light. The interference light is converted by an opto-electric converter 16 into an electric signal corresponding to its intensity. An optical phase modulator 17 is disposed between the beam splitter 12 and one end 13a of the optical transmission line 13. The optical phase modulator 17 is controlled by a square-wave modulating signal (a biasing signal) from a controller 18, whereby the light incident to the one end 13a of the optical transmission line 13 and the light emitted from the same end 13a are each subjected to a $+\pi/4$ rad. phase shift and a $-\pi/4$ rad. phase shift which alternate with each other every light propagation time $\tau$ of the optical transmission line 13. The output of the opto-electric converter 16 is synchronously detected by a synchronous detector 19 in synchronization with the phase shift for each period $\tau$.

The phase difference $\phi$ between the right-handed light and the left-handed light at the time of their interference and the output intensity S of the opto-electric converter 16 bear such a relationship as indicated by the curve 21 in FIG. 2. In the state in which an angular rate about the axis of the loop of the optical transmission line 13 is not being applied thereto, the phase difference between the right-handed light and the left-handed light varies by $\pi/2$ in the positive and the negative direction about the phase 0 for each period $\tau$ as indicated by the curve 22 in FIG. 2, owing to the modulation by the optical phase modulator 17. In this case, the output of the opto-electric converter 16 becomes constant as indicated by the curve 23 and the output of the synchronous detector 19 becomes zero. When the angular rate about the axis of the loop of the optical transmission line 13 is applied thereto, however, a phase difference $\phi_R$ is induced between the right-handed light and the left-handed light, by the Sagnac effect, in accordance with the direction and the magnitude of the applied angular rate. The phase shift by the optical phase modulator 17 is superimposed on the phase difference $\phi_R$, and the phase difference between the right-handed light and the left-handed light varies while being shifted $\phi_R$ from the phase 0, as indicated by the curve 24. Consequently, the output of the opto-electric converter 16 at that time varies for each period $\tau$ as indicated by the curve 25. The level difference for each period $\tau$ and the phase relative to the modulating signal of the optical phase modulator 17 (in phase or 180° out of phase) are detected by the synchronous detector 19. The detected output of the synchronous detector 19 is negatively fed back to the optical phase modulator 17 so that the output of the detector 19 may be reduced to zero. The magnitude and direction of the input angular rate can be obtained from the negative feedback amount and its polarity. In general, the phase shift by the modulating signal (or the biasing signal) in the optical phase modulator 17 is switched between $+\pi/4$ rad. every period $\tau$. That is, when the right-handed light 14 phase shifted $+\pi/4$ rad. and incident to the optical transmission line 13 at the one end 13a is emitted from the other end 13b after the lapse of the propagation time $\tau$, the phase shift by the optical phase modulator 17 is switched to $-\pi/4$ rad., accordingly the left-handed light 15, which enters the optical transmission line 13 at the other end 13b simultaneously with the right-handed light 14 at the one end 13a and is emitted from the one end 13a for input into the optical phase modulator 17 after the lapse of time $\tau$, is subjected to the $-\pi/4$ rad. phase shift. Consequently, the phase difference between the right-handed light 14 and the left-handed light 15 is $+\pi/2$ rad. after they propagate through the optical transmission line 13 in opposite directions and are combined with each other by the beam splitter 12. Likewise, the right-handed light 14 and the left-handed light 15 which propagate through the optical transmission line 13 and reach the beam splitter 12 in the next period $\tau$ are phase shifted $-\pi/4$ rad. and $+\pi/4$ rad., respectively, and hence their phase difference is $-\pi/2$ rad. Thus, the operating point of the optical phase modulation is set so that the phase difference $\phi$ varies about the point of the most steep gradient on the curve 21, i.e. the point of the highest sensitivity, in accordance with the input angular rate $\phi_R$.

Where the phase of light is shifted by the optical phase modulator 17 in such a stepwise manner that the duration (or width) and the height of one step of a phase shift ramp are equal to the period $\tau$ and a phase $\phi_s$, respectively, as shown in FIG. 3A, the difference $\phi$ between the phase of the left-handed light (indicated by the solid line) and the phase of the right-handed light (indicated by the broken line) delayed behind the former by $\tau$ is equal to the height $\phi_s$ of one step of the phase shift ramp as depicted in FIG. 3B. By controlling the height $\phi_s$ of one step (hereinafter refereed to as a phase step) of the stepwise phase shift (hereinafter referred to as a digital phase ramp) so that the output of the synchronous detector 19 may be reduced to zero, the phase step $\phi_s$ becomes equal to the Sagnac phase difference $\phi_R$ which is introduced by the input angular rate. In general, the Sagnac phase difference $\phi_R$ is given by the following equation:

$$\phi_R = \frac{4\pi RL}{\lambda C} \Omega \tag{1}$$

where R is the radius of the loop of the optical transmission line 13, L is the length of the optical transmission line (formed by an optical fiber) 13, $\lambda$ is the wavelength of the light source 11, C is the velocity of light in a vacuum, and $\Omega$ is the input angular rate. Hence, by controlling the height of the phase step so that $\phi_s = \phi_R$, the input angular rate $\Omega$ becomes as follows:

$$\Omega = \frac{\lambda C}{4\pi RL} \quad (2)$$

The input angular rate can be obtained by deriving the step size $\phi_s$ of the stepwise modulating signal of the optical phase modulator 17 from its relationship to the phase shift amount and then substituting the step size into Eq. (2).

Furthermore, since the phase step $\phi_s$ of the digital phase ramp is equal to the input angular rate $\phi_R$, it is also possible to obtain the input angular rate $\phi_R$ by counting the frequency f of the digital phase ramp. Letting the maximum phase of the digital phase ramp be represented by $2P\pi$ and the number of steps in one period T of the digital phase ramp by m, as shown in FIG. 3A, since the following relationships exist:

$$m\phi_s = 2P\pi, \; m\tau = T = 1/f,$$

it follows that $$\phi_s = 2P\pi \times \tau/T = 2P\pi\tau f \quad (3)$$

Substitution of Eq. (3) into Eq. (2) gives $$\Omega = \frac{\lambda C}{2RL} P\tau f \quad (4)$$

Since $\tau = nL/C$, where n is the refractive index of the optical transmission line formed by optical fiber 13, its substitution into Eq. (4) gives $$\Omega = \frac{n}{2R} Pf \quad (5)$$

Hence, the input angular rate $\Omega$ can be obtained by measuring the frequency f of the digital phase ramp.

Also in this digital phase ramp system, biasing of $+\pi/4$ rad. and biasing of $-\pi/4$ rad. are alternately superimposed on the digital phase ramp so as to provide for increased sensitivity to a very small input. Consequently, the total phase shift of light by the optical phase modulator 17 alternately repeats a period I in which biasing of $-\pi/4$ rad. is added to the digital phase ramp of the step size $\phi_s$ and a period II in which biasing of $+\pi/4$ rad. is added, as shown in FIG. 4. The ramp signal of a digital value corresponding to the digital phase shift and the biasing signal of a digital value corresponding to the $\pm\pi/4$ rad. biasing are added together by a digital adder (not shown) in the controller 18, and the added value is converted into an analog signal, which is applied as the modulating signal to the optical phase modulator 17. In this instance, when the above-mentioned digital adder overflows, it provides an output corresponding to the overflow, and this overflow is set to a value corresponding to that amount of the aforementioned total phase shift which exceeds $2\pi$ rad. Accordingly, as shown in FIG. 4, when the digital signal corresponding to the $+\pi/4$ rad. biasing is added to the above-said ramp signal and an overflow occurs in a $\tau$ period IV starting at a time point $t_1$, the total phase shift of the adder output becomes a small value, and in the next $\tau$ period III no overflow is caused by the addition of the digital signal corresponding to the $-\pi/4$ rad. biasing. In other words, the overflow period IV and the non-overflow period III alternate with each other. Letting the relative error of the phase step $\phi_s$ to the Sagnac phase error $\phi_R$ be represented by $\Delta\phi$, the phase difference $\phi$ between the right-handed light and the left-handed light is $\Delta\phi - \pi/2$ rad. in the period I, $\Delta\phi + \pi/2$ rad. in the period II, $\Delta\phi - 3\pi/2$ rad. in the period IV, and $\Delta\phi + 3\pi/2$ rad. in the period III, as shown in FIG. 5. Since the opto-electric converter 16 has such an output characteristic as indicated by the curve 21 in FIG. 6, its output corresponds to a point I in the period I, a point II in the period II, a point IV in the period IV, and a point III in the period III. Ideally, the output values at the operating points I and III coincide and the output values at the operating points II and IV coincide, and irrespective of the presence or absence of an overflow of the aforementioned digital adder, an error signal corresponding to the error $\Delta\phi$ can be obtained. However, the situation may sometimes arise where the output values at the operating points I and III do not coincide nor do the output values at the operating points II and IV coincide owing to the nonlinearity of the optical phase modulator 17; accordingly, a correction is effected. In the above, when the input angular rate is reverse in direction, the digital phase ramp is negative in value and is varied in the negative direction, and also in this case, the problem of overflow is encountered.

In view of the above, the conventional digital phase ramp system has such a construction as shown in FIG. 7, in which the light source 11, the beam splitter 12 and the optical transmission line 13 are not shown for the sake of brevity. The output of the opto-electric converter 16, such as a photodiode, is amplified by an amplifier 26 as required, and is supplied to first through fourth sample-and-hold circuits 27 to 30 in such a manner as to be sampled and held in any one of them for each period $\tau$. That is, the amplified output of the opto-electric converter 16 is sampled and held in the first sample-and-hold circuit 27 in the period I in FIGS. 4 and 5, in the second sample-and-hold circuit 28 in the period II, in the third sample-and-hold circuit 29 in the period III, and in the fourth sample-and-hold circuit 32 in the period IV. The difference between the outputs of the first and second sample-and-hold circuits 27 and 28 is detected by a first differential amplifier 31, and the difference between the outputs of the third and fourth sample-and-hold circuits 29 and 30 is detected by a second differential amplifier 32. In other words, the circuits 27 to 30, the differential amplifiers 31 and 32 and a change-over switch 33 constitute the synchronous detector 19 in FIG. 1. In the state in which the phase step $\phi_s$ which is provided between the right-handed light and the left-handed light cancels the Sagnac phase difference $\phi_R$ in accordance with the step size of the digital phase ramp signal, the total phase difference $\phi$ between the right-handed light and the left-handed light assumes a value equal to any one of approximately $-\pi/2$, $+\pi/2$, $+3\pi/2$ and $-3\pi/2$ rad. (see FIG. 6); accordingly the outputs of the differential amplifiers 31 and 32 are reduced to virtually zero. The positions of these phase differences of $-\pi/2$, $+\pi/2$, $+3\pi/2$ and $-3\pi/2$ rad. will hereinafter be referred to as equilibrium operating points of the phase control loop. If the aforementioned error $\Delta\phi$ is present, then the actual operating point shifts from these equilibrium operating points and an error signal corresponding to the shift amount is produced.

The outputs of the first and second differential amplifiers 31 and 32 are switched by the change-over switch 33 and its output is provided via an amplifier 34 having a PID (Proportional plus Integral plus Derivative) function to an A/D converter 35, by which it is converted to a digital signal for each period $\tau$. The digital signal is applied to a step value generator 36, by which a step value (the value of the height of one step) of the digital ramp signal is generated.

The step value generator 36 is constituted as a cumulative adder in which, for each period $\tau$, the output digital signal of the A/D converter 35 and the output of a register 37 are added together by an adder 38 and the added value is stored in the register 37. In the steady state in which the Sagnac phase difference $\phi_R$ is being substantially cancelled by the step phase difference $\phi_S$, the output of the A/D converter 35 assumes 0 or a value which alternates between +1 and −1 in accordance with the error $\Delta\phi$ between these two phase differences. The error is cumulatively added (or integrated) by the step value generator 36, and when the output of the A/D converter 35 is reduced to zero, the output value of the step value generator 36 becomes substantially constant. When the input angular rate changes, the output digital signal of the A/D converter 35 increases in the positive or negative direction accordingly, causing a change in the output value of the step value generator 36.

The output of the step value generator 36 is provided to a ramp signal generator 39, which generates a digital ramp signal having a step height equal to the output of the step value generator 36 and a step width (i.e. the duration) equal to the period $\tau$. That is, for every period $\tau$ the outputs of the step value generator 36 and a register 41 are added together by an adder 42 and the added output is stored in the register 41; consequently, the output of the adder 42 becomes a digital ramp signal which is incremented, for each period $\tau$, by the amount of the output of the step value generator 36 in the positive o negative direction corresponding to its sign (positive or negative). This digital ramp signal is applied to an adder 44, wherein it is added to the output of a biasing signal generator 43 which alternates, for each period $\tau$, between digital biasing signals corresponding to the $+\pi/4$ rad, phase shift and the $-\pi/4$ rad. phase shift, respectively. The added output of the adder 44 is converted by a D/A converter 45 into an analog signal, which is provided as a modulating signal to the optical phase modulator 17.

A controller 46 is supplied with the output of an oscillator 47 having a frequency $f=1/\tau$ and synchronously controls, for every period $\tau$, the converting operation of the A/D converter 35, the step value generating operation of the step value generator 36, the step value adding operation of the ramp signal generator 39 and the digital biasing signal generating operation of the biasing signal generator 43. Furthermore, the controller 46 is supplied with a signal OVF from the adder 44 which indicates the presence or absence of an overflow therefrom and a bias sign signal BSN from the biasing signal generator 43 which indicates whether it is generating the biasing signal corresponding to $+\pi/4$ rad. or the biasing signal corresponding to $-\pi/4$ rad. Based on the presence or absence of an overflow in the current period $\tau$, the presence or absence of an overflow in the preceding period and the biasing signal being currently generated, the controller 46 selects one of the first to fourth sample-and-hold circuits 27 to 30 on the conditions shown in FIG. 8, effecting sample-and-hold control for every period $\tau$. Moreover, the controller 46 controls the change-over switch 33 to connect the first differential amplifier 31 to the amplifier 34 during the sample-and-hold operation of the first and second sample-and-hold circuits 27 and 28 and to connect the second differential amplifier 32 to the amplifier 34 during the sample-and-hold operation of the third and fourth sample-and-hold circuits 29 and 30.

In this instance, the magnitude and polarity of the output of the step value generator 36 are controlled by the negative feedback loop so that the amount of phase of one step $\phi_s$ of the digital phase ramp in the optical phase modulator 17 caused by the output digital ramp signal from the ramp signal generator 39 may cancel the Sagnac phase amount $\phi_R$ caused by the input angular rate $\Omega$. Thus, the zero method is accomplished.

The difference between the outputs of the first and third sample-and-hold circuits 27 and 29 is detected by a differential amplifier 48, whereas the difference between the outputs of the second and fourth sample-and-hold circuits 28 and 30 is detected by a differential amplifier 49. The outputs of the differential amplifiers 48 and 49 are selectively applied via an analog change-over switch 51 to an analog integrator 52. Under control of the controller the change-over switch 51 connects the differential amplifier 48 or 49 to the analog integrator 52, depending on whether the third or fourth sample-and-hold circuit 29 or 30 is being selected, and in other cases the switch 51 remains in its previous connecting state. The conversion gain of the D/A converter 45 is controlled by the output of the analog integrator 52, and negative feedback control is effected so that the output values at the operating points I and III in FIG. 6 coincide each other and the output values at the operating points II and IV coincide each other.

The conventional digital phase ramp type fiber optic gyro described above is disclosed in Japanese Patent Application Laid Open No. 29715/86, for instance.

In the above-described conventional digital phase ramp system the total phase difference $\phi$ between the right-handed light and the left-handed light in the presence of an overflow is always handled as either one of $\pm 3\pi/2$ rad. In other words, it is considered in the prior art that the overflow occurs when the digital biasing signal has a value corresponding to $+\pi/4$ rad. with respect to the positive digital phase ramp signal and a value corresponding to "$\pi/4$ rad. with respect to the negative digital phase ramp signal.

However, when an angular rate is input which causes the Sagnac phase shift $\phi_R$ in excess of $\pm\pi/2$ rad., an overflow may sometimes occur with respect to a digital biasing signal shown in row A of FIG. 9 when a signal obtained by superimposing the digital biasing signal on the digital phase ramp signal is a digital biasing signal corresponding to $-\pi/4$ rad., as shown in the period V in row B of FIG. 9. At this time, the total phase difference $\phi$ between the right-handed light and the left-handed light is $-5\pi/2$ rad. as depicted in the period V in row C of FIG. 9. Conventionally, it is determined, in this instance, that the total phase difference $\phi$ between the right-handed light and the left-handed light is $+3\pi/2$ rad., because the overflow occurs and because the biasing signal corresponds to $-\pi/4$ rad. as shown in FIG. 8. In consequence, a sample-and-hold instruction is provided to the third sample-and-hold circuit 29 and the change-over switch 51 applies the output of the differential amplifier 48 to the integrator 52, controlling the conversion gain of the D/A converter 45. As will be seen from FIG. 6, in the negative feedback control which operates so that the outputs S of the opto-electric converter 16 at the operating points I and III may be equal to each other, if the operating point III, for instance, is slightly moved toward the operating point I along the curve 21, the output S at the operating point III decreases. Conversely, if the operating point V is slightly moved toward the operating point I, then the output S at the operating point V increases. That is to say, control for making the output at the operating point III equal to the output at the operating point I and control for making the output at the operating point V equal to the output at the operating point I are reverse in characteristic from each other. If the output difference between the sample-and-hold circuits 27 and 29, which is the output of the differential amplifier 48, is provided via the switch 51 to the feedback loop although the actual operating point is V, then the closed loop which ought to act as a negative feedback loop serves as a positive feedback loop, making measurements impossible. To avoid this, in the conventional fiber optic gyro of the digital phase ramp system it is inhibited to input a high angular rate which allows the Sagnac phase shift $\phi_R$ to exceed $+\pi/2$ rad.—this constitutes a serious obstacle to enlargement of the dynamic range of measurable input angular rates.

Besides, when an analog signal converted from the digital signal produced by the ramp signal generator 39 and an analog signal converted from the digital biasing signal created by the biasing signal generator 43 are supplied to the optical phase modulator independently of each other, the phase difference between the right-handed light and the left-handed light may sometimes become $\pm 5\pi/2$ rad. regardless of the input angular rate as shown in row C of FIG. 10, as in the case of the relationship between the phase shift by a digital ramp signal depicted in row A of FIG. 10 and the phase shift by a biasing signal depicted in row B of FIG. 10. Also in this instance, the same problem as mentioned above occurs and no correct measurement can be achieved.

SUMMARY OF THE INVENTION

It is therefore an object of the present invention to provide a digital phase ramp type fiber optic gyro which, even if the phase difference between the right-handed light and the left-handed light is $\pm 5\pi/2$ rad., detects the Sagnac phase shift and hence achieves the zero method and permits measurements of high angular rate inputs and enlargement of the input dynamic range.

In the fiber optic gyro of the present invention, a first error signal which corresponds to the difference between the outputs for providing the phase differences $+\pi/2$ and $-\pi/2$ between the right-handed light and left-handed light is detected from the output of the opto-electric converter which converts the interference light into an electric signal, and based on the first error signal, the step value of the digital ramp signal is determined. A cumulative adder accumulates such step values and, when the accumulated result exceeds $2 m\pi$ (where m is a positive integer), causes an overflow and outputs a sign signal representing its polarity. The digital ramp signal of the accumulated output is converted by a D/A converter to an analog signal, which is applied to the optical phase modulator. Second error signal detecting means detects, as a second error signal, the difference between the outputs of the opto-electric converter at the operating point where an overflow occurs and the immediately preceding operating point. Based on the overflow polarity signal and a signal representing the polarity of the corresponding biasing signal, negative feedback control means determines which of $+(4m-1)\times\pi/2$, $-(4m-1)\times\pi/2$, $-(4m+1)\times\pi/2$ and $+(4m+1)\times\pi/2$ is the operating point where the overflow occurs. The second error signal is multiplied by a positive or negative sign corresponding to the result of the above determination to produce a negative feedback error signal, which is used to control the conversion gain of the aforementioned D/A converter.

DESCRIPTION OF THE PREFERRED EMBODIMENTS

Figure 7:
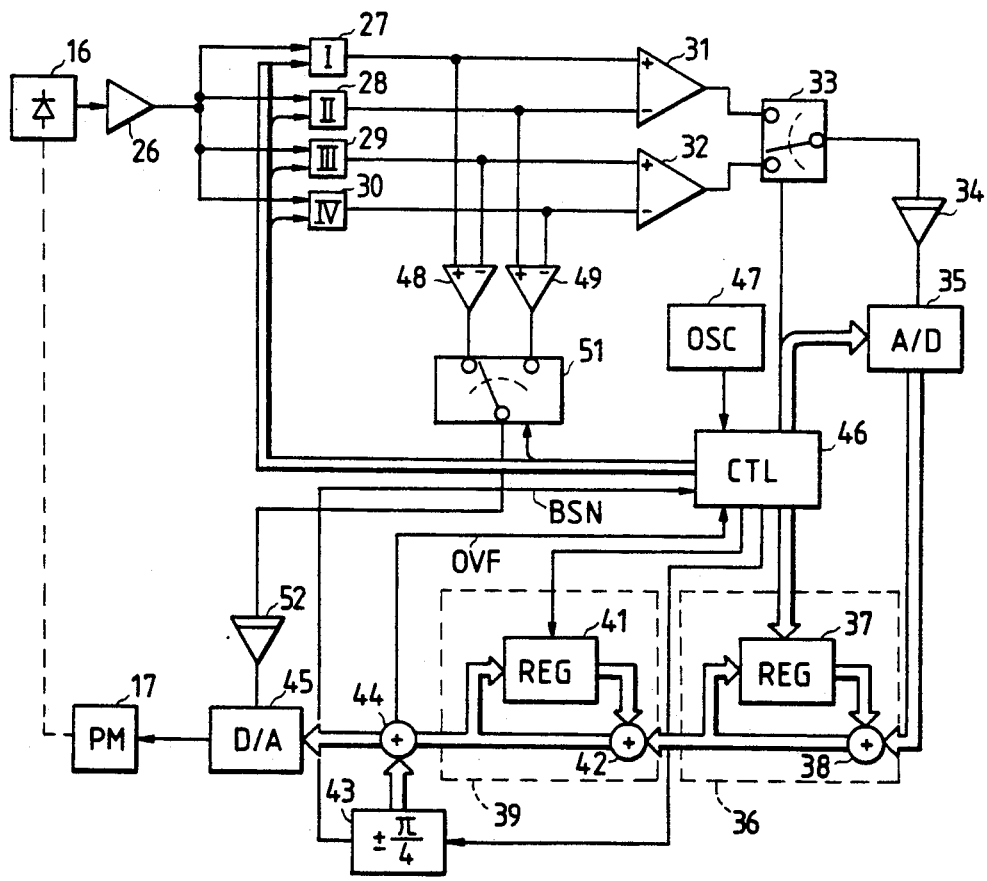
FIG. 7 is a block diagram illustrating the principal part of a conventional digital phase ramp type fiber optic gyro.
Figure 11:
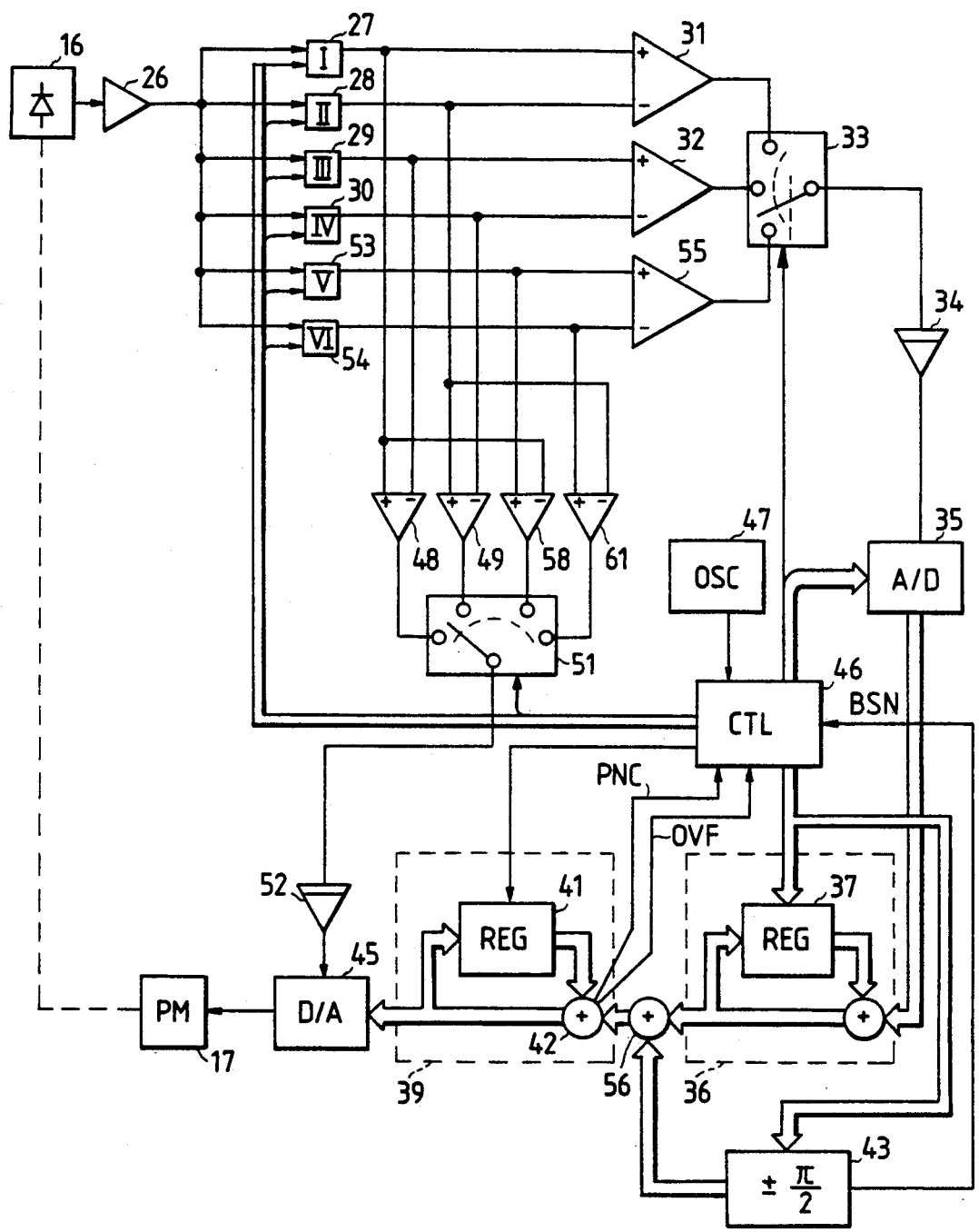
FIG. 11 is a block diagram illustrating the principal part of an embodiment of the present invention.

FIG. 11 illustrates in block form an embodiment of the present invention, in which the parts corresponding to those in FIG. 7 are identified by the same reference numerals Also in FIG. 11 the light source 11, the beam splitter 12 and the optical transmission line 13 are not shown. According to the present invention, the output of the amplifier 26 is provided to fifth and sixth sample-and-hold circuits 53 and 54 as well. The fifth and sixth sample-and-hold circuits 53 and 54 are controlled by the controller 46 so that the former performs the sample-and-hold operation when the phase difference $\phi$ between the right-handed light and the left-handed light is $-5\pi/2$ rad. and the latter performs the sample-and-hold operation when the phase difference $\phi$ is $+5\pi/2$ rad. The difference between the outputs of the fifth and sixth sample-and-hold circuits 53 and 54 is detected by a third differential amplifier 55. The switch 33 is controlled by the controller 46 so that when the fifth and sixth sample-and-hold circuits 53 and 54 are each performing the sample-and-hold operation, the output side of the third differential amplifier 55 is connected to the input side of the amplifier 34. In this embodiment, the biasing signal generator 43 alternately generates, for each period $\tau$, a digital biasing signal which shifts the phase of light by $+\pi/2$ rad. and a digital biasing signal which shifts the phase of light by $-\pi/2$ rad., and the biasing signal and the output of the step value generator 36 are added together by an adder 56, the output of which is supplied to the ramp signal generator 39. In consequence, the output of the ramp signal generator 39 is the sum of the digital ramp signal and the biasing signal and is applied directly to the D/A converter 45. Provided that the input angular rate $\Omega$ is zero, the output of the step value generator 36 is zero, and the biasing signal corresponding to $+\pi/2$ rad. and the biasing signal corresponding to $-\pi/2$ rad. are accumulated by the ramp signal generator 39 for every period $\tau$. The output of the ramp signal generator 39 alternates between a digital value which shifts the phase of light by $+\pi/2$ rad. and zero at regular intervals of the period $\tau$; accordingly the phase difference $\phi$ between the right-handed light and the left-handed light alternates between $+\pi/2$ rad. and $-\pi/2$ rad. at regular intervals of the period $\tau$. It will easily be understood from the above that when an angular rate is input, the step value generator 36 generates the step value correspondingly and the ramp signal generator 39 outputs a signal produced by superimposing a $+\pi/4$ rad. biasing signal and a $-\pi/4$ rad. biasing signal alternately with each other on a digital ramp signal whose step height equal to the step value output from the step value generator 36. Further, the biasing signals for providing the phase differences $+\pi/2$ rad. and $-\pi/2$ rad. between the right-handed light and the left-handed light, respectively, are output alternately with each other every period $\tau$ as described above, accordingly the differential amplifiers 31, 32 and 55 and the corresponding pairs of sample-and-hold circuits 27 and 28, 29 and 30, and 53 and 54 all detect the difference between the outputs of the opto-electric converter 16 corresponding to the phase differences $+\pi/2$ and $-\pi/2$ by the biasing signals. Any of these difference outputs represents an error of the phase step $\phi_s$ relative to the Sagnac phase difference $\phi_R$.

The controller 46 receives from the ramp signal generator 39 the signal OVF indicating the presence or absence of an overflow and an overflow sign signal PNC which, when an overflow occurs, indicates whether the overflow exceeds a positive maximum value (the sign of the overflow being made positive) or a negative maximum value in the negative direction (the sign of the overflow being made negative). Further, the controller 46 is supplied with a bias sign signal BSN from the biasing signal generator 43 which indicates whether the biasing signal therefrom is being providing the phase difference $+\pi/2$ or $-\pi/2$. Based on these signals and the conditions shown in FIG. 12, the controller 46 samples and holds any one of the first to sixth sample-and-hold circuits 27, 53 and 54 every $\tau$ period. The overflow sign information is obtained by detecting whether a sign bit of the ramp signal generator 39 changes from 0 to 1 or from 1 to 0 when the overflow occurs.

Figure 1:
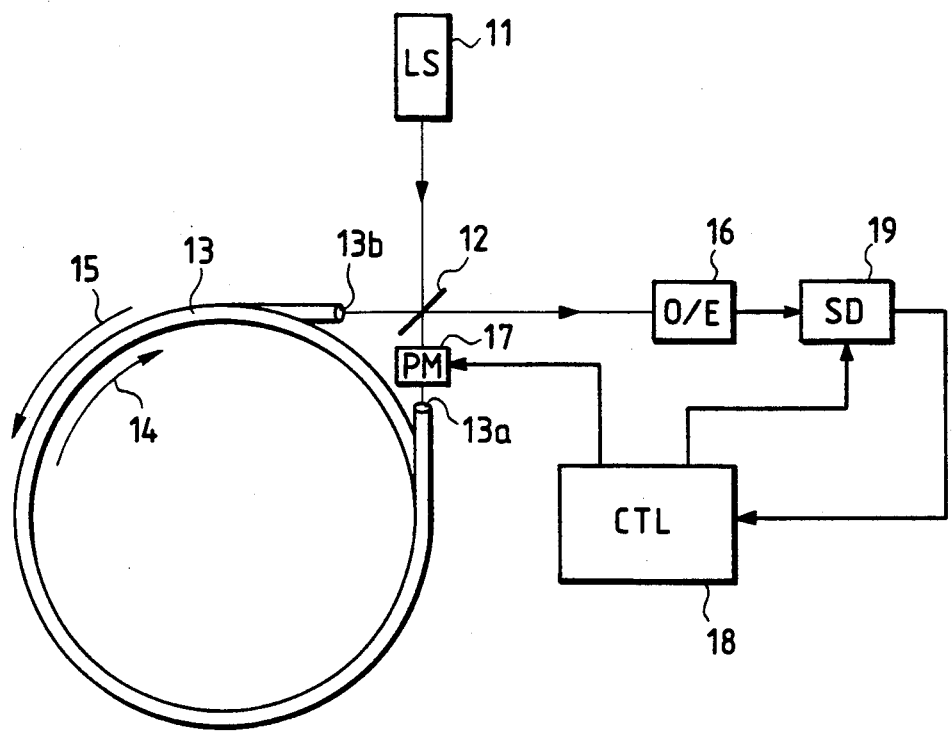
FIG. 1 is a diagram schematically showing a zero-method fiber optic gyro.
Figure 3A:
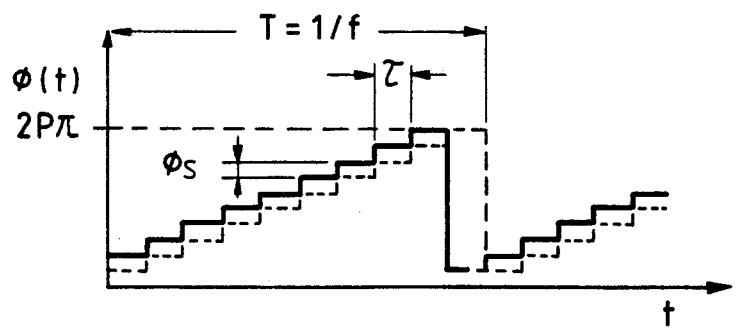
FIG. 3A is a diagram showing a digital phase ramp.
Figure 3B:
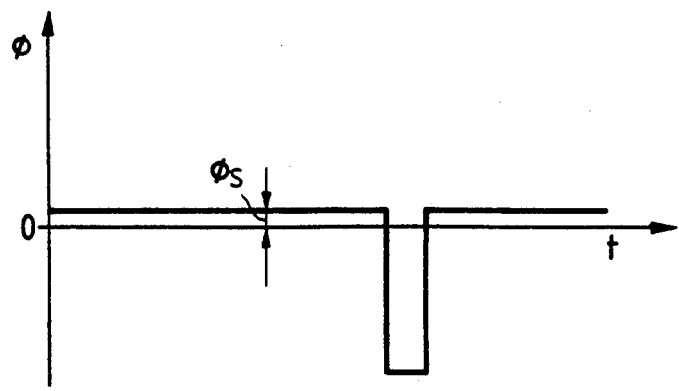
FIG. 3B is a diagram showing the relationship of the phase difference $\phi$ to the digital phase ramp.
Figure 2:
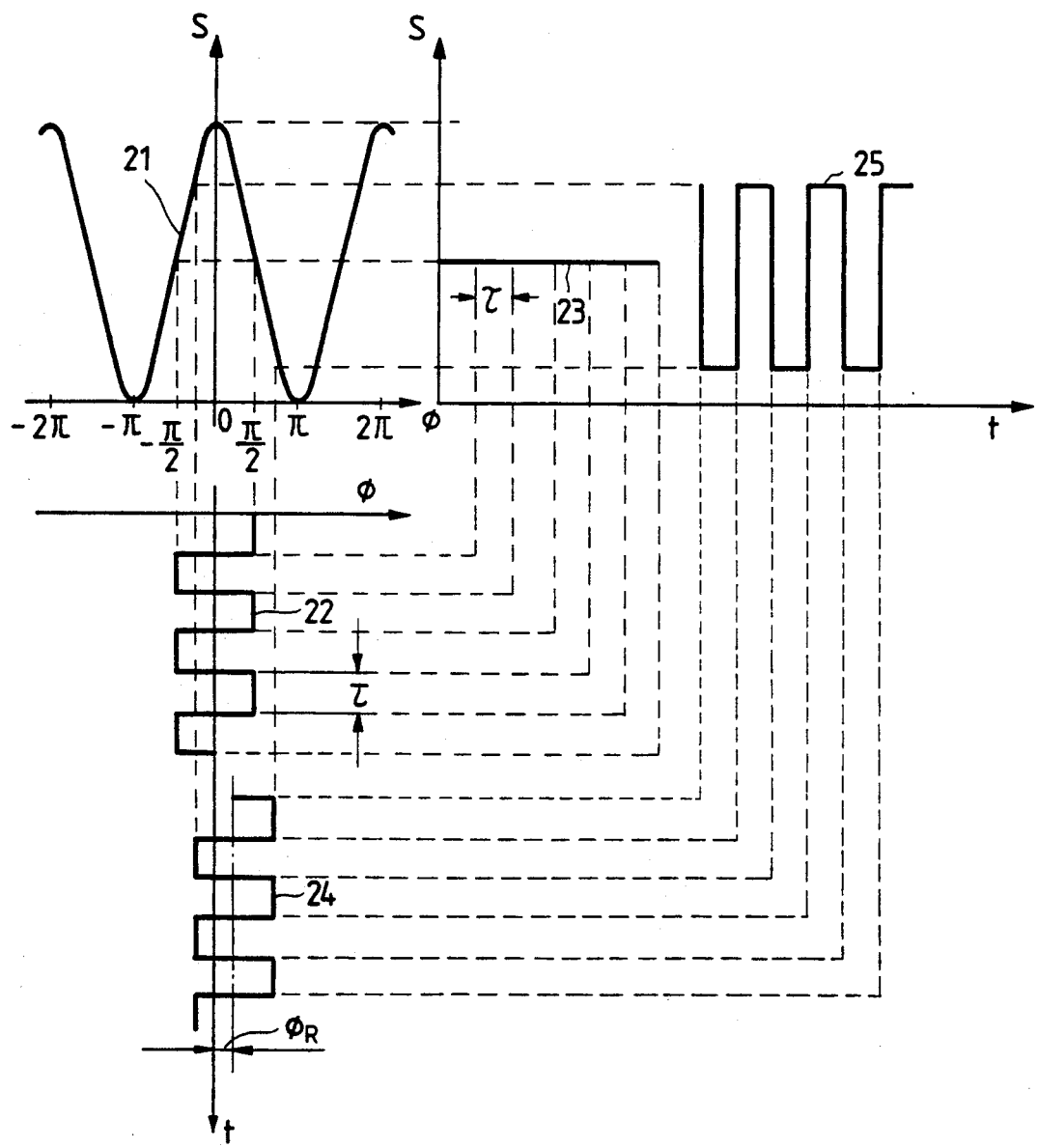
FIG. 2 is a diagram showing, by way of example, the output characteristic 21 of the opto-electric converter 16 with respect to the phase difference $\phi$ between the right-handed light and the left-handed light and variations of the output from the opto-electric converter 16 with respect to variations in the phase difference $\phi$ by biasing and the Sagnac phase shift.
Figure 4:
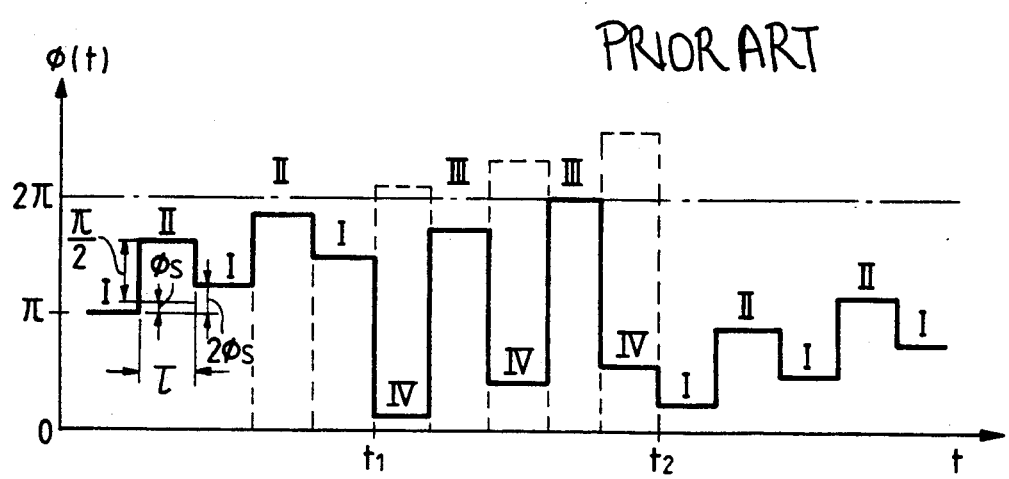
FIG. 4 is a diagram showing the superimposition of biasing on the digital phase ramp.
Figure 5:
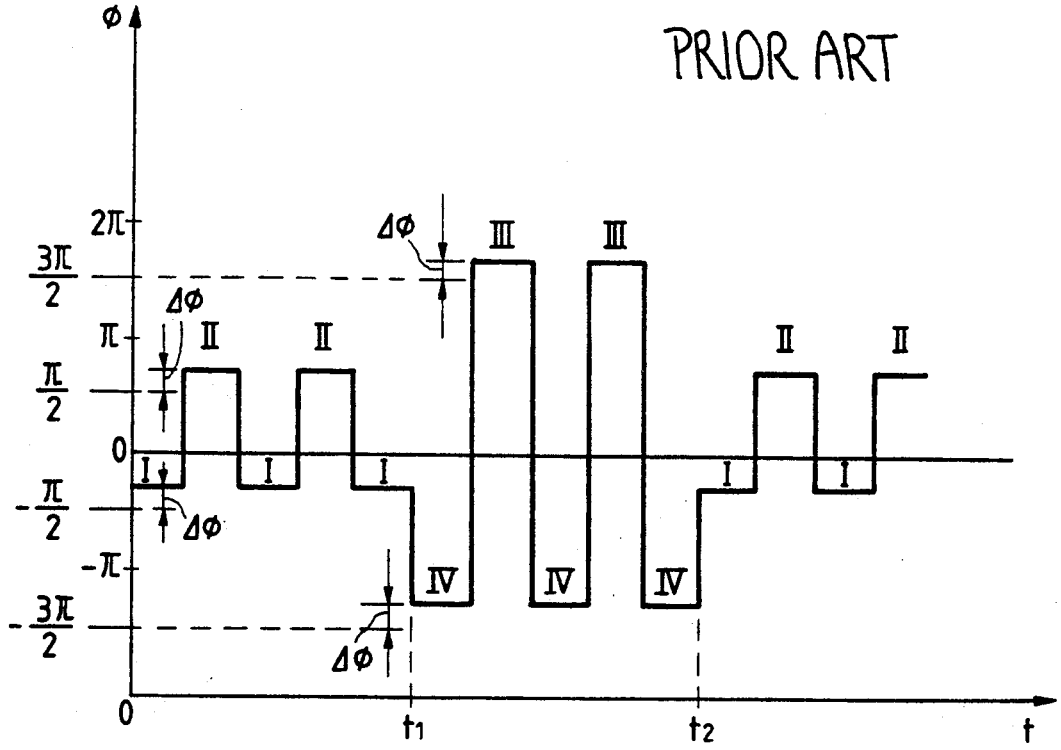
FIG. 5 is a diagram showing the phase difference $\phi$ in respective periods in FIG. 4.
Figure 6:
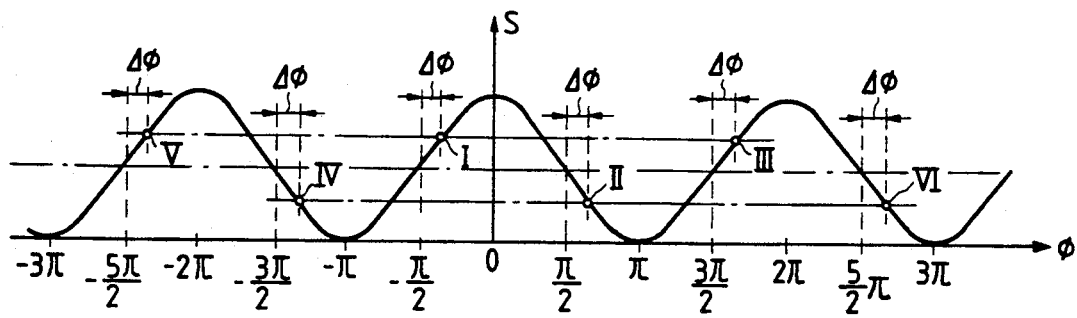
FIG. 6 is a diagram showing output variations of the opto-electric converter 16 with respect to the phase difference $\phi$ and outputs in respective periods in FIG. 5.
Figures 8, 9:
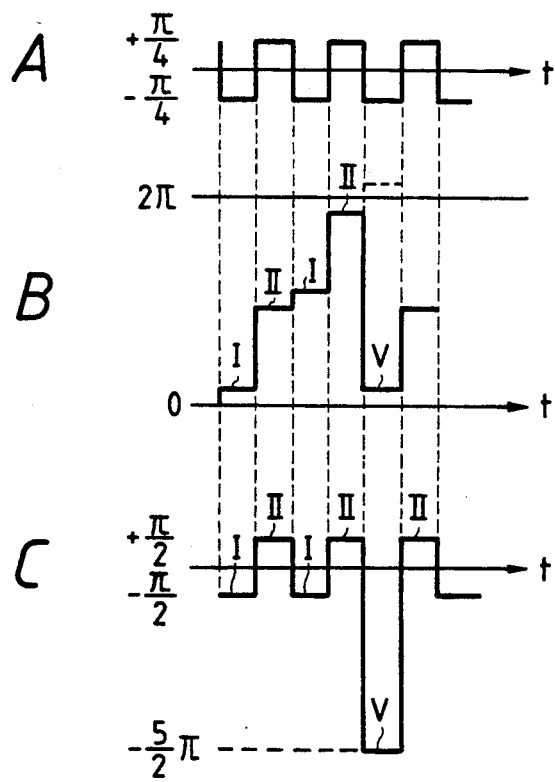
FIG. 8 is a table showing control conditions for first to fourth sample-and-hold circuits.
FIG. 9 is a diagram showing the case in which phase difference $\phi$ becomes $-5\pi/2$ rad. owing to an excessive input angular rate.

In consequence, for instance, in the state in which the periods I and II in FIG. 9 are repeated alternately with each other, that is, in the state in which the first and second sample-and-hold circuits 27 and 28 alternately sample and hold the outputs at the operating points I and II in FIG. 6, if an overflow exceeding the positive maximum value is caused by the $-\pi/2$ rad. biasing signal after the period II, the fifth sample-and-hold circuit 53 performs the sample-and-hold operation in the period V, by which the output at the operating point V in FIG. 6 is sampled and held. Yet, since the sample value of the output at the operating point V and the sample value of the output at the operating point III are substantially the same, it is also possible to omit the differential amplifier 55 and effect the same control as in the case of FIG. 7.

Figures 10, 12:
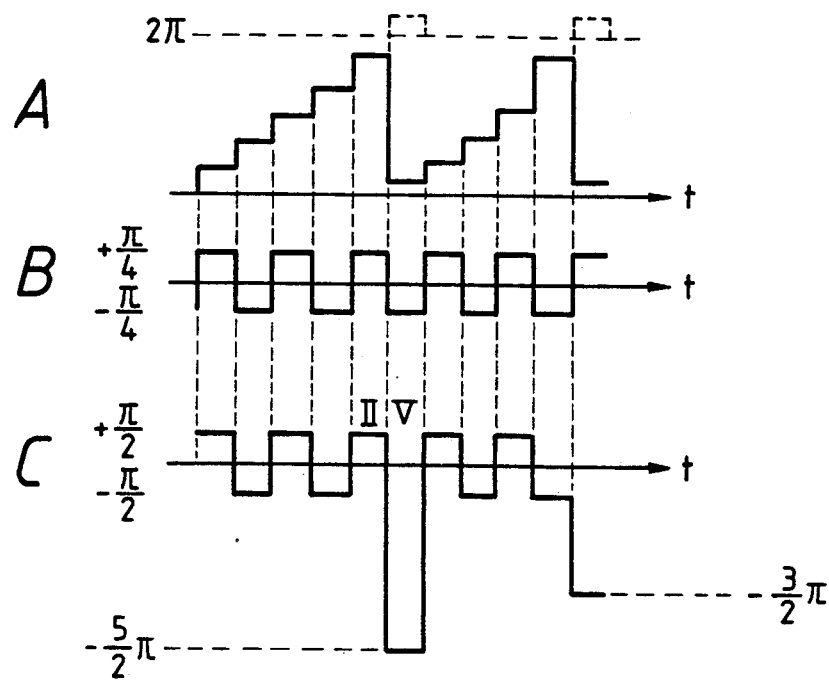
FIG. 10 is a diagram showing the case in which the phase difference $\phi$ becomes $-5\pi/2$ rad. when a digital ramp signal and a biasing signal are applied to the optical phase modulator independently of each other.
FIG. 12 is a table showing control conditions for first to sixth sample-and-hold circuits.

As shown in FIG. 6, the slope of the curve 21 at the operating point IV is reverse in polarity from its slope at the operating point I but the slope at the operating point V has the same polarity as the slope at the operating point; accordingly the slopes at the operating points IV and V are opposite in polarity. On this account, the embodiment of the present invention shown in FIG. 11 has an arrangement in which the differential amplifier 48 subtracts the output of the third sample-and-hold circuit 29 from the output of the first sample-and-hold circuit 27, whereas the differential amplifier 58 subtracts the output of the first sample-and-hold circuit 27 from the output of the fifth sample-and-hold circuit 53. Similarly, the differential amplifier 49 subtracts the output of the fourth sample-and-hold circuit 30 from the output of the second sample-and-hold circuit 28, whereas the differential amplifier 61 subtracts the output of the second sample-and-hold circuit 29 from the output of the sixth sample-and-hold circuit 54. The change-over switch 51 is controlled by the controller 46 to connect the differential amplifier 58 or 61 to the analog integrator 52, depending on whether the fifth or sixth sample-and-hold circuit 53 or 54 is in the sample-and-hold state. Consequently, the conversion gain of the D/A converter 45 is controlled so that the output S at the point V in FIG. 6 may coincide with the output S at the point I and so that the output S at the point IV may coincide with the output S at the point II. That is, when supplied with the overflow signal OVF from the adder 42, the controller 46 determines to which of the equilibrium operating points $+3\pi/2$ (i.e. III), $-3\pi/2$ (i.e. IV), $-5\pi/2$ (i.e. V) and $+5\pi/2$ (i.e. VI) the operating point at that time corresponds, based on the overflow signal OVF, the overflow sign signal PNC, the bias sign signal BSN of the biasing signal at that time and the table shown in FIG. 12, and then the controller 46 controls the switch 51 to select one of the differential amplifiers 48, 49, 58 and 61 which corresponds to the operating point thus determined. With such an arrangement, the polarity of an error signal from any of the differential amplifiers 48, 49, 58 and 61 which are selectively output via the switch 51, based on the table shown in FIG. 12, is set so that the error signal is negatively fed back to the D/A converter 45 via the analog integrator 52.

Figure 13:
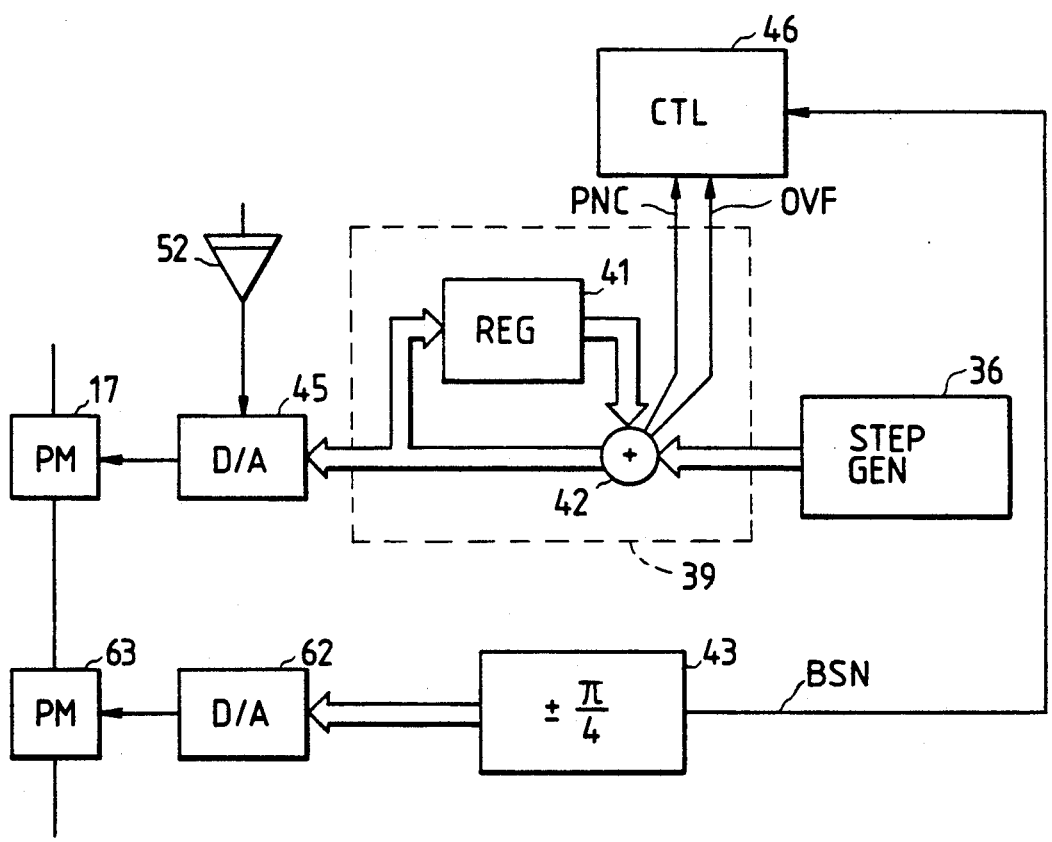
FIG. 13 is a block diagram illustrating the principal part of another embodiment of the present invention.

FIG. 13 illustrates the principal part of another embodiment of the present invention. The output of the step value generator 36 is provided directly to the ramp signal generator 39, the digital ramp signal of which is supplied to the D/A converter 45, and its output is used to modulate the optical phase modulator 17. On the other hand, the biasing signal generator 43 generates the digital biasing signal for the $+\pi/4$ rad. phase shift and the digital biasing signal for the $-\pi/4$ rad. phase shift alternately with each other every $\tau$ period, and the output of the biasing signal generator 43 is converted by a D/A converter 62 to an analog signal, which is used to modulate an optical phase modulator 63 connected in cascade to the optical phase modulator 17. This means that the optical phase modulation by the digital ramp signal and the optical phase modulation by the biasing signal may also be carried out independently of each other. Also in this instance, the control shown in FIG. 12 is effected through utilization of the overflow information OVF of the ramp signal generator 39, its sign information PNC and the information BSN indicating the output state of the biasing signal generator 43, by which, for example, when the operation changes from the period II to the period V in FIG. 10, the fifth sample-and-hold circuit 53 operates, performing a correct control operation.

While in the above description control is effected with the period of $\tau$, the control may also be made with a period which is an odd-number multiple of $\tau$, that is, $l\tau$ (where $l=1, 3, 5, \ldots$ ). The embodiments of the invention have been described in connection with the case where the peak value of the phase shift amount of each of the right-handed and the left-handed light is $2\pi$, but in general, the peak value can be set to $2m\pi$ (where m is a positive integer), in which case the maximum value at which the adder 42 overflows is set to a value corresponding to the peak value $2m\tau$. Further, it is preferable, in this instance, to employ an arrangement in which the sample-and-hold circuits 29, 30, 53 and 54 sample and hold the output S of the opto-electric converter 16 during the periods in which the total phase differences are $+(2m-1)\times\pi/2$, $-(2m-1)\times\pi/2$, $-(2m+1)\times\pi/2$ and $+(2m+1)\times\pi/2$, respectively.

As described above, according to the present invention, any states in which the phase difference between the right-handed and the left-handed light are $\pm 3\pi/2$ and $\pm 5\pi/2$ rad. are detected, based on the sign signal PNC of an overflow of the adder 42 and the bias sign signal BSN of the biasing signal, and the corresponding control is effected. Hence, even an input angular rate at which the Sagnac phase exceeds $\pi/2$ rad. can also be measured correctly and the input dynamic range can be enlarged. Moreover, the digital ramp signal and the biasing signal can be supplied to optical phase modulators independently of each other.

It will be apparent that many modifications and variations may be effected without departing from the scope of the novel concepts of the present invention.

What is claimed is:

1. A digital phase ramp type fiber optic gyro comprising:
    a light source;
    a beam splitter for splitting light from said light source into two beams;
    a looped optical transmission line to which said two beams from said beam splitter are applied as right-handed light and left-handed light for propagation therethrough;
    interference means for causing right-handed light and left-handed light emitted from said optical transmission line to interfere with each other;
    an opto-electric converter supplied with interference light from said interference means, for outputting an electric signal corresponding to the intensity of said interference light;
    optical phase modulating means disposed between one end of said optical transmission line and said beam splitter and electrically controlled to shift the phase of light;
    biasing signal generating means for generating a digital biasing signal which is a square wave having a period twice longer than a time $l\tau$ which is an odd-number multiple of the light propagation time $\tau$ of said optical transmission line and having a 50% duty and which provides $+\pi/2$ and $-\pi/2$ rad. bias phase differences alternately between said right-handed light and said left-handed light for each period $l\tau$ by said optical phase modulating means and for generating a bias sign signal representing the sign of each of said bias phase differences, l being 1, 3, 5, ...;
    first error signal detecting means for detecting a first error signal corresponding to the difference between the outputs of said opto-electric converter when said biasing signal is providing said $+\pi/2$ rad. phase difference and said $-\pi/2$ rad. phase difference, respectively;
    an A/D converter for converting said first error signal to a digital error signal corresponding thereto;
    step value generating means whereby a step value of a magnitude and a sign for cancelling a Sagnac phase difference provided between said right-handed light and said left-handed light by an angular rate input to said optical transmission line is generated, based on said digital signal supplied from said A/D converter;
    ramp signal generating means which accumulates said step value for every period $l\tau$ and, when the accumulated result exceeds a predetermined maximum value corresponding to $2m\pi$, m being a positive integer, regards an overflow value as said accumulated result, outputs as a digital ramp signal said accumulated result varying for every period $l\tau$ and, when said overflow occurs, outputs an overflow signal indicating the occurrence of said overflow and an overflow sign signal indicating the sign of said overflow;
    D/A converting means whereby, based on said digital biasing signal and said digital ramp signal, an analog signal for controlling said optical phase modulating means is generated;
    second error signal detecting means for detecting, as a second error signal, the difference between the output levels of said opto-electric converter at the time of occurrence of said overflow signal and at the immediately preceding period; and
    feedback control means which, based on said overflow sign signal and said bias sign signal at the time of occurrence of said overflow signal, determines which of $+(2m-1)\times\pi/2$, $-(2m-1)\times\pi/2$, $-(2m+1)\times\pi/2$ and $(2m+1)\times\pi/2$ the phase difference between said right-handed light and said left-handed light at the time of occurrence of said overflow signal corresponds to, which generates a negative feedback error signal by multiplying said second error signal by a positive or negative sign dependent on the result of said determination, and which controls the gain of said D/A converting means, based on said negative feedback signal.

2. The fiber optic gyro of claim 1, which includes an adder for adding together said step value output from said step value generating means and said digital biasing signal from said biasing signal generator and for supplying as a biased step value the result of said addition to said ramp signal generating means, and wherein said digital biasing signal is a signal which alternates, at intervals of said period $l\tau$, between first and second digital values corresponding to $+\pi/2$ rad. and $-\pi/2$ rad., respectively, said ramp signal generator accumulates said added result from said adder to thereby output a digital ramp signal biased by said digital biasing signal, and said D/A converting means converts said biased digital ramp signal to an analog signal for input into said optical phase modulating means.

3. The fiber optic gyro of claim 1, wherein said digital biasing signal generated by said biasing signal generator is a signal which alternates between first and second digital values by which a $+\pi/4$ rad. change and a $-\pi/4$ rad. change are alternately provided, at intervals of said period $l\tau$, to the phase of light propagating through said optical transmission line, said D/A converting means includes a first D/A converter which converts said digital ramp signal to an analog ramp signal and whose conversion gain is controlled corresponding to said negative feedback error signal from said feedback control means and a second D/A converter for converting said digital biasing signal to an analog biasing signal, and said optical phase modulating means includes first and second optical phase modulators connected in series to each other and supplied with said analog ramp signal and said analog biasing signal, respectively, for modulating the phase of light propagating through said optical transmission line.

4. The fiber optic gyro of claim 1 or 2, wherein m=1; wherein said second error signal detecting means includes: a first sample-and-hold circuit for sampling and holding the output of said opto-electric converter when the phase difference between said right-handed light and said left-handed light, except said Sagnac phase difference therebetween by said angular rate input into said optical transmission line, is $-\pi/2$ rad.; a second sample-and-hold circuit for sampling and holding said output of said opto-electric converter when said phase difference is $+\pi/2$ rad.; a third sample-and-hold circuit for sampling and holding said output of said opto-electric converter when said phase difference is $+3\pi/2$ rad.; a fourth sample-and-hold circuit for sampling and holding said output of said opto-electric converter when said phase difference is $-3\pi/2$ rad.; a fifth sample-and-hold circuit for sampling and holding said output of said opto-electric converter when said phase difference is $-5\pi/2$ rad.; a sixth sample-and-hold circuit for sampling and holding said output of said opto-electric converter when said phase difference is $+5\pi/2$ rad.; a first differential amplifier for outputting an error of the output of said third sample-and-hold circuit with respect to the output of said first sample-and-hold circuit; a second differential amplifier for outputting an error of the output of said fourth sample-and-hold circuit with respect to the output of said second sample-and-hold circuit; a third differential amplifier for outputting, in a reverse polarity, an error of the output of said fifth sample-and-hold circuit with respect to the output of said first sample-and-hold circuit; a fourth differential amplifier for outputting, in a reverse polarity, an error of the output of said sixth sample-and-hold circuit with respect to the output of said second sample-and-hold circuit; and a change-over switch for selectively providing therethrough the output of said first to fourth differential amplifiers; and wherein said negative feedback control means includes an integrator which integrates the difference signal selectively provided by said change-over switch and applies said integrated output to said D/A converter as a signal for controlling its conversion gain.

5. The fiber optic gyro of claim 4, wherein said first error signal detecting means includes: a fifth differential amplifier for outputting the difference between the outputs of said first and second sample-and-hold circuits; a sixth differential amplifier for outputting the difference between the outputs of said third and fourth sample-and-hold circuits; a seventh differential amplifier for outputting the difference between the outputs of said fifth and sixth sample-and-hold circuits; and a select switch for selectively providing therethrough the difference outputs of said fifth, sixth and seventh differential amplifiers as said first error signal.

* * * * *